United States Patent [19]
Stencel

[11] 3,807,671
[45] Apr. 30, 1974

[54] ESCAPE AND RECOVERY SYSTEM

[75] Inventor: Fred B. Stencel, Asheville, N.C.

[73] Assignee: Stencel Aero Engineering Corporation, Arden, N.C.

[22] Filed: Mar. 5, 1973

[21] Appl. No.: 338,268

[52] U.S. Cl............................................. 244/138 R
[51] Int. Cl............................................ B64d 25/00
[58] Field of Search............ 244/138 R, 138 A, 147, 244/141, 149, 122 AD, 122 AB, 17.15

[56] References Cited
UNITED STATES PATENTS

| | | | |
|---|---|---|---|
| 3,442,473 | 5/1969 | Rivedal et al...................... | 244/141 |
| 2,931,598 | 4/1960 | Sanctuary.......................... | 244/141 |
| 3,210,025 | 10/1965 | Lubben et al.................... | 244/138 A |

Primary Examiner—Duane A. Reger
Assistant Examiner—Charles E. Frankfort
Attorney, Agent, or Firm—Roylance, Abrams, Berdo & Kaul

[57] ABSTRACT

An escape and recovery system is provided for accomplishing satisfactory and safe escape from an incapacitated helicopter or other slow flying aircraft capable of hovering at low altitudes. The system incorporates an extraction rocket which extracts the occupant from the disabled or incapacitated helicopter and which deploys his parachute into the airstream. The rocket is made to become aerodynamically unstable above a selective threshold speed so that above this value the airstream forces cause the rocket to turn into a downwind direction, thereby properly placing the inflated parachute downwind for fastest action and thereby avoiding any post-ejection interference between the occupant, the parachute and the incapacitated helicopter.

21 Claims, 20 Drawing Figures

PATENTED APR 30 1974 3,807,671
SHEET 01 OF 11
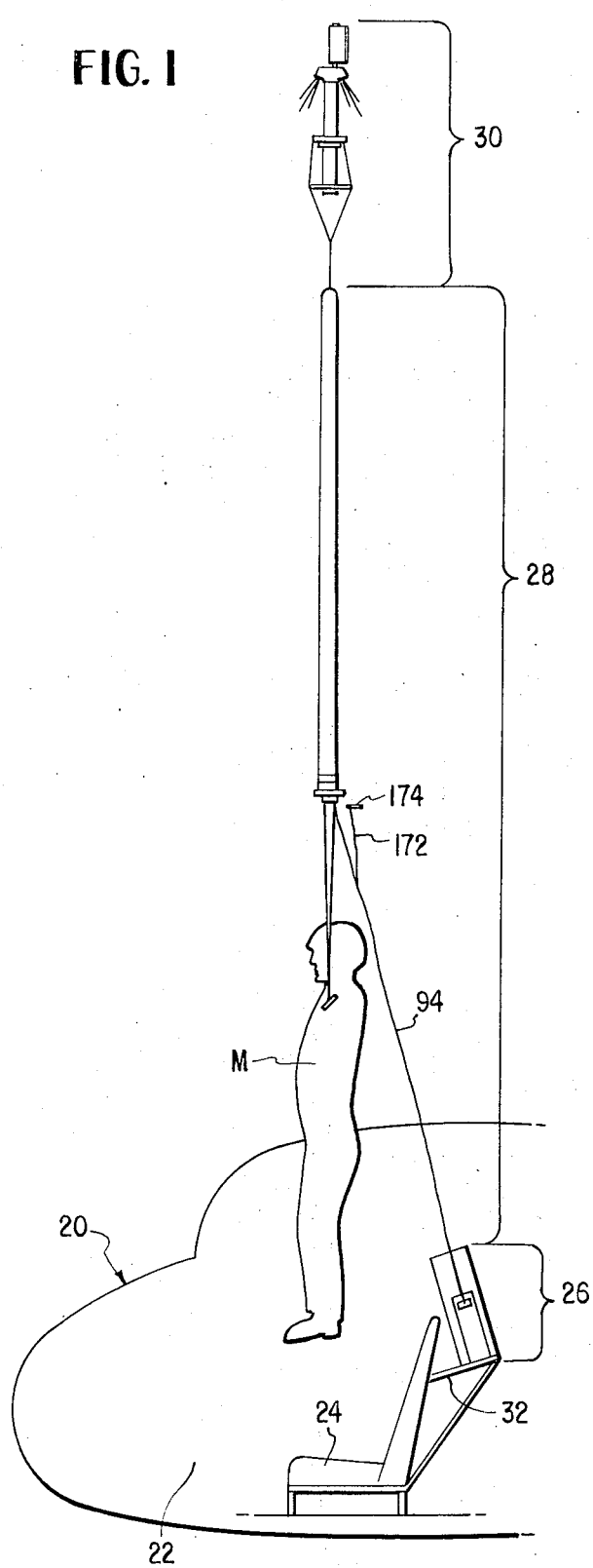
FIG. I
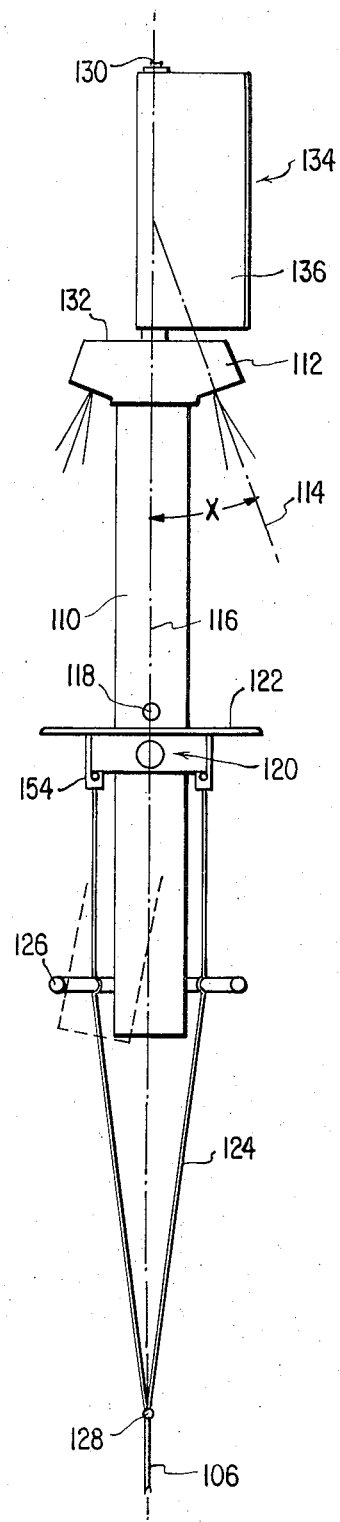
FIG. 6

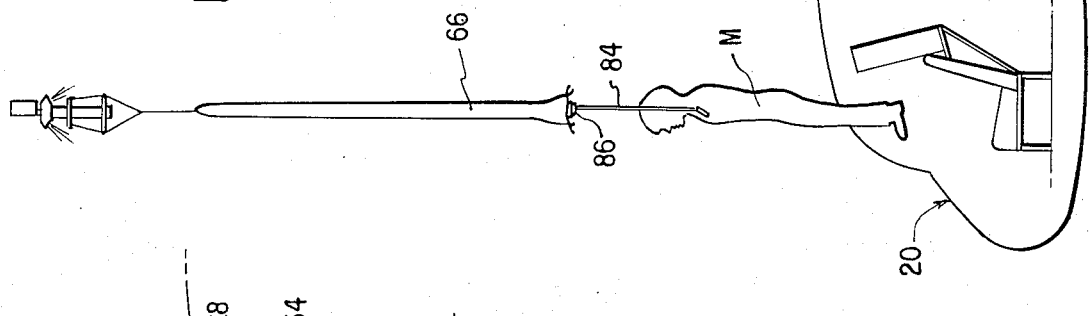
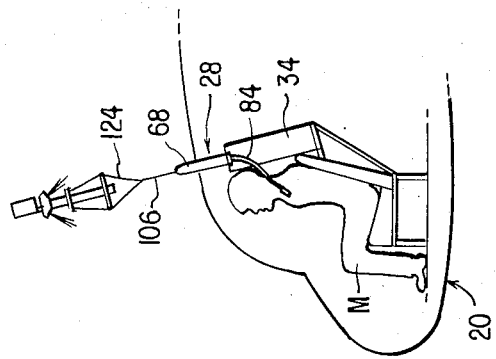
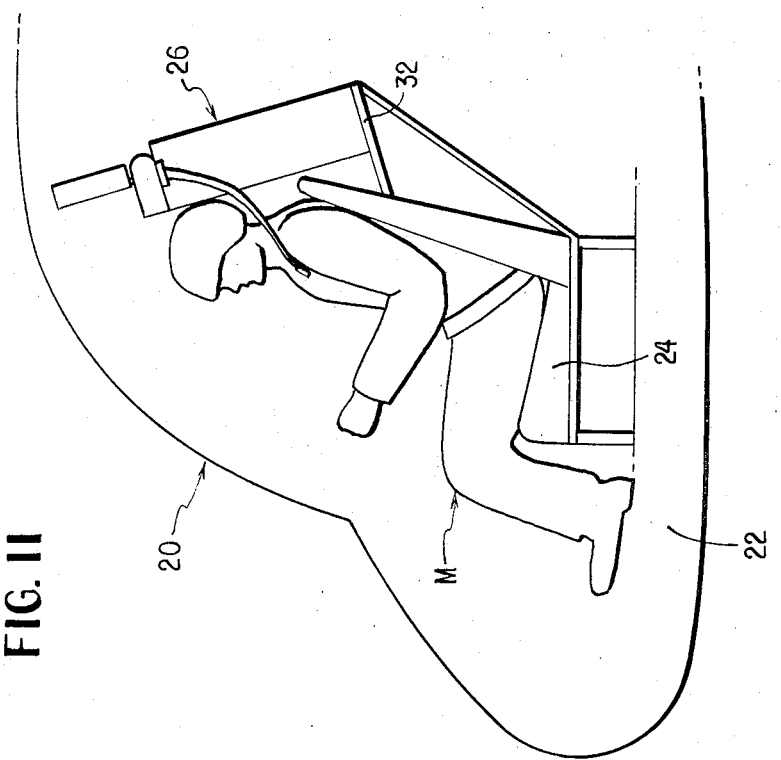

ESCAPE AND RECOVERY SYSTEM

This invention relates to an aerial escape and recovery system and more particularly it relates to a system which permits an occupant to safely escape from an incapacitated or disabled low flying and/or slow flying aircraft, particularly those that are capable of hovering, such as helicopter or a VTOL aircraft.

For hovering type aircraft which normally operate at low altitudes, any emergency situation arising from a disability or incapacitation of the aircraft presents an extremely dangerous situation. That is, because of the fact that the aircraft might be operating at a relatively low altitude, there is only a small amount of distance and a very short period of time between low altitude or hovering flight and a subsequent crash onto the ground. It is true that for hovering aircraft such as a helicopter there is the ability to attempt a landing of a disabled craft by means of autorotation. However, there is a critical altitude for an autorotational landing, typically 200 feet, and if the aircraft is operating or hovering beneath that safe autorotational altitude it is not possible to effect a satisfactory autorotational landing and it becomes necessary to escape quickly from the helicopter in case of disability or incapacity.

On the other hand, it must be recognized that because of the unique capability of a helicopter to hover at low altitudes, it is customary for helicopters to be used at such low altitudes for extended periods of time. For example, helicopters are often operated below safe autorotational altitudes for such tasks as lifting or lowering external loads, operating rescue hoists and in combat missions involving launching of certain types of missiles. At such low altitudes, there are all types of emergency situations would could arise to incapacitate or disable the helicopter. These conditions include loss of power which could arise because of engine failure, fuel supply cut-off or transmission train failure; loss of control which could arise due to failure of the hydraulic system, the tail rotor or the tail rotor transmission, entanglement with a suspended load or an air blast from an enemy missile could be strong enough to turn or flip the helicopter on its back; damage due to fire; structural damage to the rotors either by fatigue failure, contact with aerial wires or enemy action; or sudden incapacitation of the helicopter pilot.

Helicopter pilots are trained to react instinctively to any such emergency which arises during a hovering operation by immediately transitioning the helicopter into autorotation. This is accomplished by bottoming out the collective pitch of the rotor, which, in turn, destroys the lift and introduces an initial rate of decent approaching free fall. It will ordinarily take the pilot at least one or two seconds to assess the conditions present during the emergency and to make a decision to initiate an escape from the helicopter. By this time, starting from a hovering condition, the sink rate can approach 64 feet per second or 3,840 feet per minute. Moreover, in order to accomplish an escape and to clear the escape path, it may be necessary to intentionally sever the rotor blades which would cause a time delay in the escape sequence on the order of 0.8 seconds. Thus, when one collectively considers the pilot reaction time and the pilot decision time coupled with the time delay for the escape operation, it becomes almost a certainty that the helicopter is sinking at the rate of 64 feet per second, and when it is remembered that the helicopter and hovering conditions is often operating beneath 200 feet, there are only a few seconds of time available to accomplish escape before the helicopter crashes into the ground.

It is, of course, known in the art that escape systems can be provided for removing occupants from disabled aircraft. Such known escape systems even include the provision of rockets to assist in the escape operation. For example, U. S. Pat. No. 3,222,015 in the name of A. E. Larsen et al. discloses an escape system for a disabled helicopter wherein the seats are laterally ejected from the helicopter and rockets attached to the seat are used to assist in accomplishing safe parachute deployment.

While prior art proposals such as that disclosed in the Larsen et al patent are conceptually sound for escape operations at normal flight altitudes, they may prove unsatisfactory under the extremely adverse conditions which could occur during a very low altitude and low speed or hovering ejection such as might be ordinarily happen if a helicopter is operating under its safe autorotational altitude. That is, in a hovering situation where the helicopter has a zero forward speed, and if a disability arose which caused the helicopter to assume a fully inverted position, the disabled helicopter with the occupant therein would very rapidly be free falling upside down straight down toward the ground. Escape from the helicopter under these conditions would be extremely difficult. Likewise, in a situation where the helicopter was hovering and hence had zero forward speed and a disability occurred which caused the helicopter to spin or turn sideways as it fell toward the ground, escape would also be extremely difficult.

The present invention recognizes and addresses itself to the specific problem of finding a satisfactory means for accomplishing satisfactory ejection from a disabled low speed or no speed hovering aircraft, such as a helicopter which is operating at a very low altitude, and it is a primary object of the present invention to enable a safe escape even under such conditions.

Another object of the present invention is to provide an effective escape system for permitting personnel to escape from a disabled or incapacitated helicopter which is hovering at an altitude below a safe autorotational altitude.

Another object of the present invention is to provide an escape system which enables an occupant to escape from an incapacitated helicopter in such a manner as to preclude a post-escape collision between the occupant and the disabled helicopter.

Another object of the present invention is to provide a helicopter escape system wherein the escapee's parachute will be properly positioned prior to its inflation and spreading.

Other objects, advantages and salient features of the present invention will become apparent from the following detailed description, which, taken in conjunction with the annexed drawings, discloses a preferred embodiment thereof.

Referring to the drawings, which form a part of this original disclosure:

FIG. 1 is a diagrammatic view showing the various sub-assemblies of the present invention;

FIG. 6 is a diagrammatic view of the extraction apparatus subassembly;

FIGS. 11–15 are diagrammatic views showing the operational sequence of the apparatus of the present invention;

Figure 2:
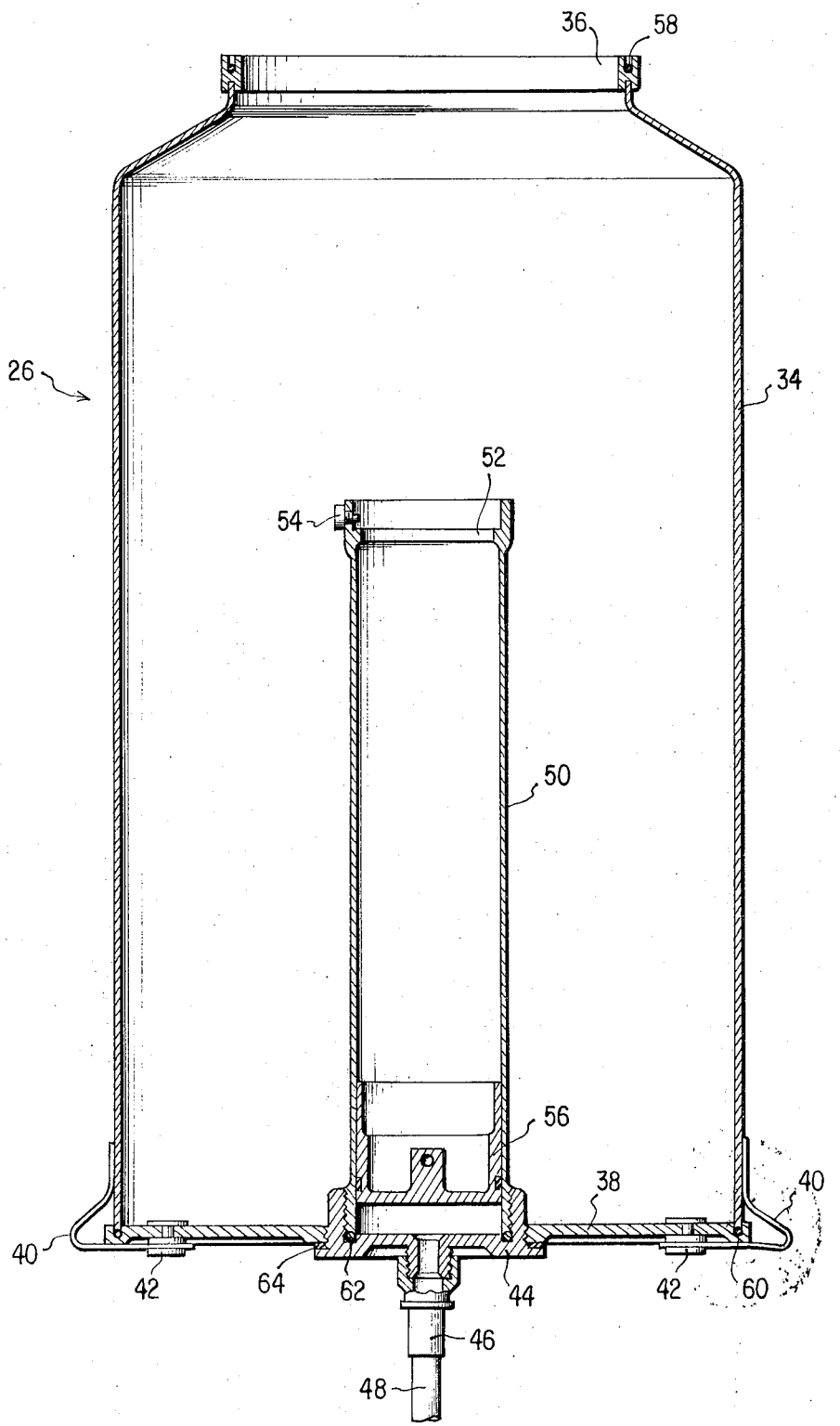
FIG. 2 is a longitudinal sectional view of the container subassembly.

The foregoing objects are attained by providing an extraction apparatus which includes a rocket having an aerodynamically unstable mounting arrangement and which, in turn is connected to the parachute subassembly. In particular, the extraction rocket includes a vane means at the nose thereof and the rocket itself is mounted by a gimbal mounting arrangement at a point rearward of the center of gravity of the rocket mass. As a result, when the rocket is fired, the aerodynamic forces acting on the vane means will have the tendancy to pivot the rocket about the gimbal mounting, seeking to move to a trailing position. This tendancy is opposed by the stability which is present because the pivot point is placed in front of the center of gravity of the rocket. As velocity increases, the destabilizing aerodynamic forces increase until they overcome this constant stabilizing factor, and beyond this threshold value the rocket will become unstable, breaking out of its initial straight path. A caging ring means mounted rearwardly of the gimbal is designed to limit the degree of angular displacement of the rocket and after this limit means has been reached. further rotation can occur only about the confluence point of the rocket bridle lines, which connects with the towlines which couple the rocket with the parachute subassembly.

The net result of this rocket and rocket mounting arrangement is to assure that above a threshold value of speed the parachute will be heading in a downstream direction prior to spreading thereof, thus assuring that canopy inflation will be proper and thus precluding any possibility of a post-escape interference between the pilot, the parachute and the disabled aircraft.

Referring now to the drawings in further detail, there is shown in FIG. 1 the nose section of an aircraft generally designated 20, which, as previously mentioned, is advantageously a helicopter but can also be a VTOL type of aircraft which is capable of hovering operations at relatively low altitudes and low air speeds. In the cockpit 22 of the aircraft there is provided a seat means 24 upon which the pilot or other occupant is ordinarily seated. For purposes of identification, the pilot or other man who might use the escape apparatus of the present invention is designated M. Obviously, the cockpit 22 is ordinarily closed by means of a partially or totally transparent canopy which ordinarily overlies the cockpit and through which the man is capable of making visual observations. In order to accomplish an escape operation using the apparatus of the present invention, the canopy must be removed, and such removal can be by any of the means which are well known in the escape art, such as, for example, explosive means attached to the canopy and arranged to operate to break or release the canopy when an escape operation is initiated. The canopy release means will not be described in any detail herein since it forms no part of the present invention.

As also shown in FIG. 1, the apparatus of the present invention includes three different subassemblies, each of which will be described in detail hereinafter. A container subassembly generally designated 26 is connected behind the seat 24. A parachute subassembly generally designated 28 provides the means for safe recovery of the man M after his escape from the aircraft 20. An extraction subassembly generally designated 30 provides the means for initiating the escape operation to remove the man M and the parachute subassembly 28 from the aircraft 20 in the vent that such aircraft becomes disabled or otherwise incapacitated.

Referring now to the container assembly 26, such subassembly is mounted on a shelf means 32 which has advantageously positioned at the rear of the seat 24, as shown in FIGS. 1 and 11. In this position, the container subassembly can serve as a head rest for the man M. The container subassembly initially stores the complete escape apparatus and it includes a generally cylindrical container 34 having an open upper end 36 and lower or base plate 38. Limit straps 40 are connected between the sides of the container 34 and the bottom of the base plate 38 where they can be retained by means of rivets 42. Centrally mounted within the base plate 38 is a cup shape support member 44 which is connected with a control hose fitting 46 and, in turn with a control hose 48. The cup shape member 44 serves to support an upstanding launch tube 50 having an axial length or height considerably less than that of the container 34. Within the launch tube 50 adjacent its open upper end there is provided an inwardly directive flange or shoulder 52 the purpose of which will be described hereinafter. A shear bolt 54 extends transversely through the launch tube 50 above the shoulder 52 and the purpose of this shear bolt is to initially assembly the rocket motor with the launch tube for purposes to be described hereinafter.

Figure 3:
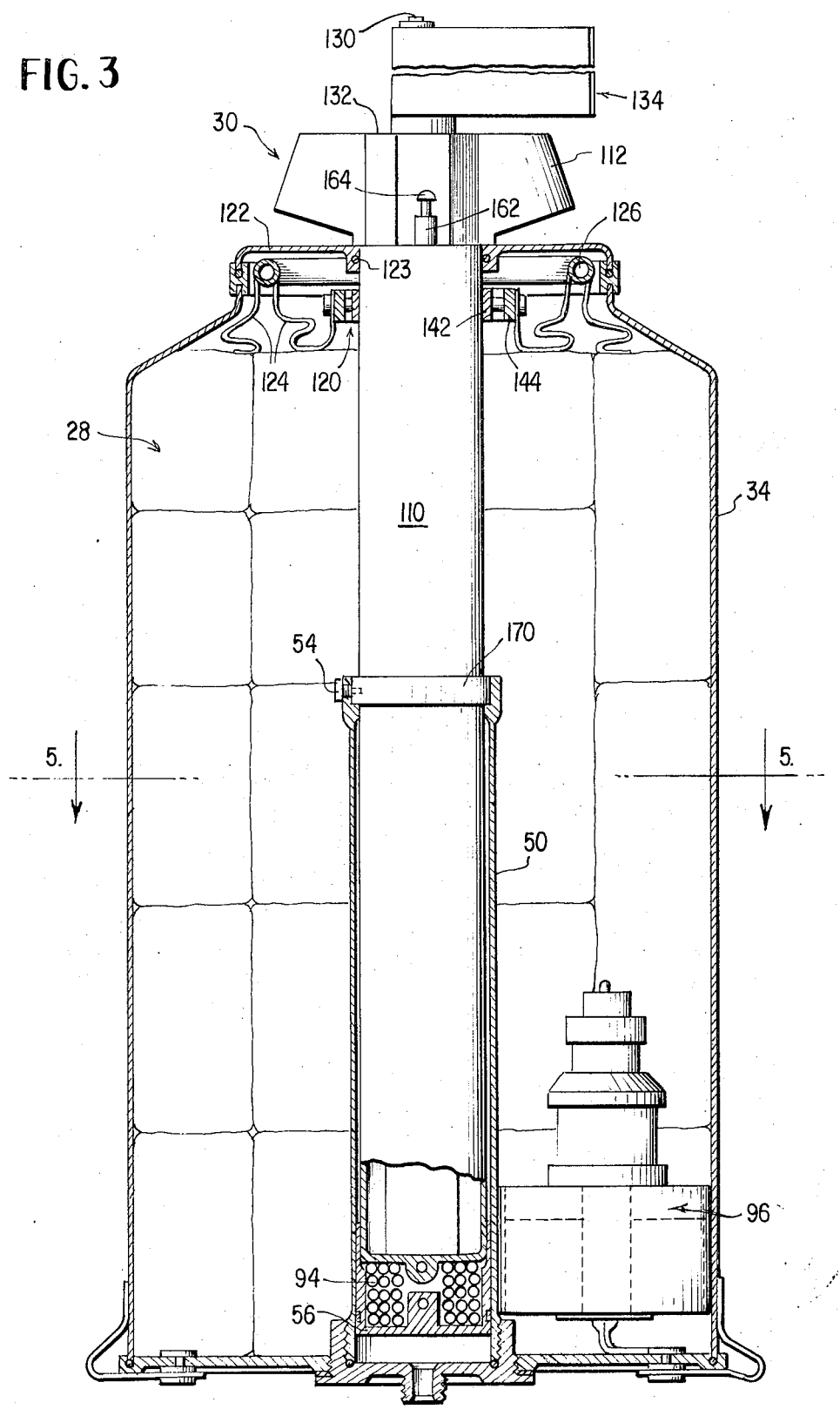
FIG. 3 is a longitudinal sectional view of the various subassemblies in their initial assembled position.

Initially, the container subassembly 26 is hermetically sealed with the parts contained therein and to accomplish such hermetic sealing, a first sealing ring 58 is provided adjacent the open top 36 of the container and a second sealing ring 60 is disposed between the lower end of the container 34 and the base plate 38. Additionally, a sealing ring 62 is positioned between the launch tube 50 and its cup shape support member 44 and a further sealing ring 64 is positioned between the support member 44 and the base plate 38. A container lid 122 has a skirt which seals against the sealing ring 58 and has an internal O-ring 123 which seals against the rocket motor as shown in FIG. 3.

Figure 10:
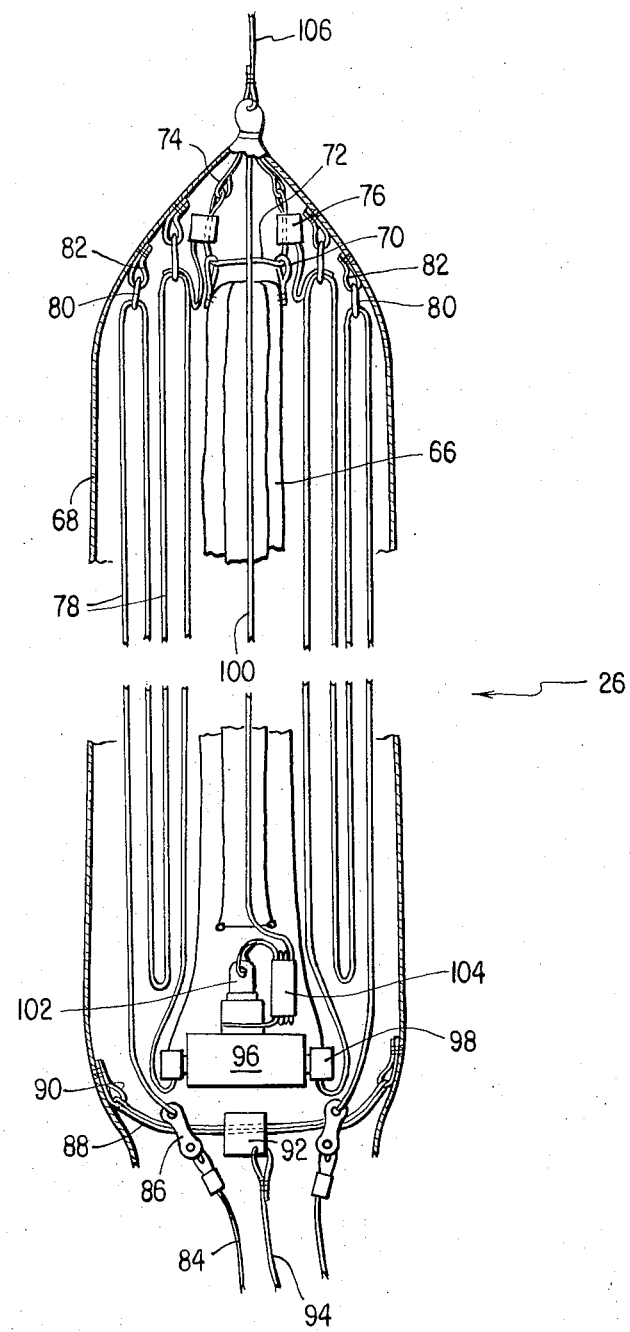
FIG. 10 is a diagrammatic view of the parachute subassembly.

Referring next to FIG. 10 for an understanding of the elements included in the parachute subassembly 28, it will be noted that the parachute canopy 66 is disposed within a protective sleeve 68. Within such sleeve, the canopy is foleded in an axisymmetrical fasion by pulling the canopy apex along the parachute axis and down to the vicinity of the canopy skirt. The canopy 66 is secured to the sleeve by a number of loops 70 sewn to the canopy through which a tie line 72 is threaded, such tie line extending through other loops 74 secured to the inside of the sleeve 68 at the apex thereof. A pair of line cutters 76 are provided along the tie line 74 and are activated by a downward pull to sever the tie line and thus free the canopy from engagement with its protective sleeve 68.

The canopy suspension lines 78 are folded along the canopy adjacent the outside surface thereof. Each suspension line fold is tied at its upper reversal point to the apex of the sleeve 68 by means of break lines 80 which connect to loops 82 sewn on the inside of the sleeve adjacent the apex thereof. The strength of these break lines is such that they will support the folded suspension lines against acceleration forces but will break sequentially when the suspension lines are deployed out of the sleeve 68. The last upper fold points of two of the suspension lines are tied to the upper cutters 76 so that as these lines pay out, they activate the cutters to free the canopy 66 from the sleeve 68 thus enabling the canopy to pay out of the sleeve.

Riser lines 84 are connected with the suspension lines by means of special steel links 86 having feathered edges thereon enabling them to pass through the seal between the container cylinder and its lid without disturbing the air tight integrity thereof. A line 88 connects between loops 90 at opposed sides along the lower end of the sleeve 68 and through the riser links 86. A lower line cutter means 92 is connected along the line 88 and is activated by means of a cutting lanyard 94.

A canopy spreading gun 96 is provided within the sleeve 68 and has ejectable slugs or projectiles 98 connected to the skirt of the canopy 66. This canopy spreading gun can be of the type shown in U. S. Pat. Nos. 3,281,098 and 3,291,423 and 3,447,769, all of which are owned by the assignee of the present invention. The details of the spreading gun shown in the aforementioned patents are hereby incorporated by reference. A firing lanyard 100 is connected to the sear 102 of the spreading gun 98 and a slack portion or surplus length of the lanyard 100 is contained within a storage bag 104 adjacent the spreading gun. As the sleeve 68 is stripped away from the canopy 66, the spreading gun lanyard is pulled out of its stowage pocket in the storage bag 104 and is pulled taut to fire the spreading gun 96 which, in turn, ejects the projectiles 98 radially outwardly to spread and inflate the canopy 66. Finally, it will be noted that a towline 106 extends from the apex of the canopy 66 and toward the extraction apparatus subassembly 30, as shown in FIG. 6.

Referring now to FIG. 6 which shows the extraction apparatus subassembly, it will be seen that such assembly includes a rocket motor 110 of the tractor or pulling type. That is, the exhaust nozzles 112 are mounted at the nose of the rocket and the axes thereof are canted outwardly to assure that the rocket jets will not cause any burning damage to surfaces of the tow line and parachute assembly.

The axis 114 of each rocket jet is offset from the center line 116 by an acute angle designated "$x$." The center of gravity of the rocket motor mass which includes the rocket motor 110 itself and all parts carried thereby, is designated 118. Somewhat rearwardly of the center of gravity point 118 by a distance designated $l_1$ the rocket is attached to a gimbal means 120 which will be described in greater detail hereinafter. Somewhat intermediate the gimbal mounting 120 and the center of gravity there is provided the container lid 122 which serves to close the opening at the top 36 of the container cylinder 34. Bridle lines 124 connect to the gimbal 120 and these bridle lines serve to support a caging ring 126 positioned generally adjacent the rear end of the rocket motor 110 to limit the angular movement thereof to an angle equal to $\beta_{max}$ as indicated in FIG. 6. The bridle lines 124 are joined together at a confluence point displaced by a distance $l_2$ from the center of gravity 118 and the towline 106 connects with such bridle lines at the confluence point which is designated 128.

Figure 4:
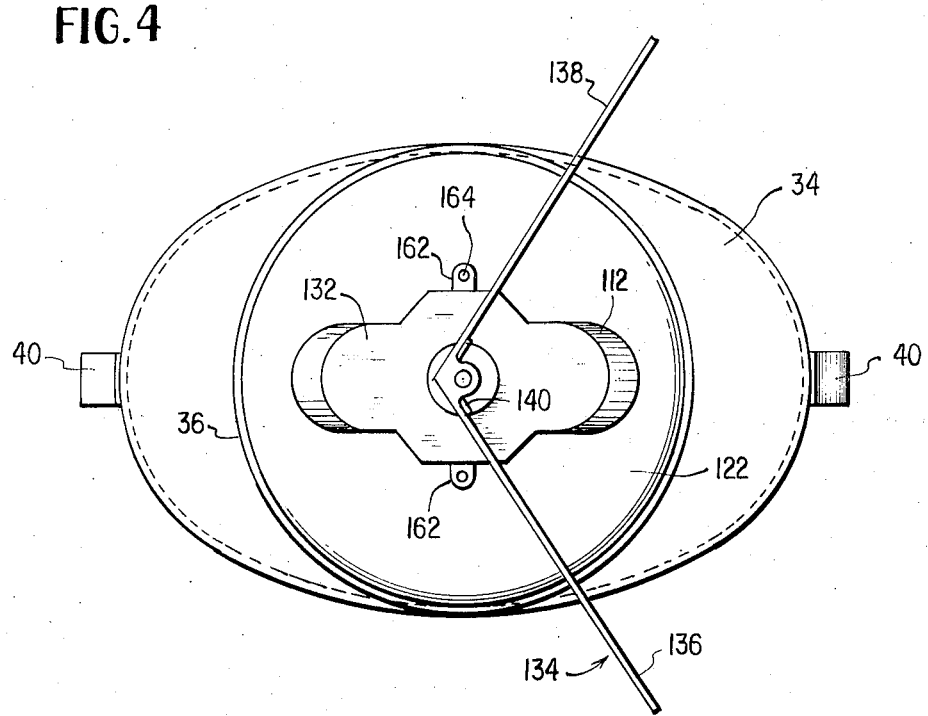
FIG. 4 is a top plan view of the assembly of FIG. 3.
Figure 5:
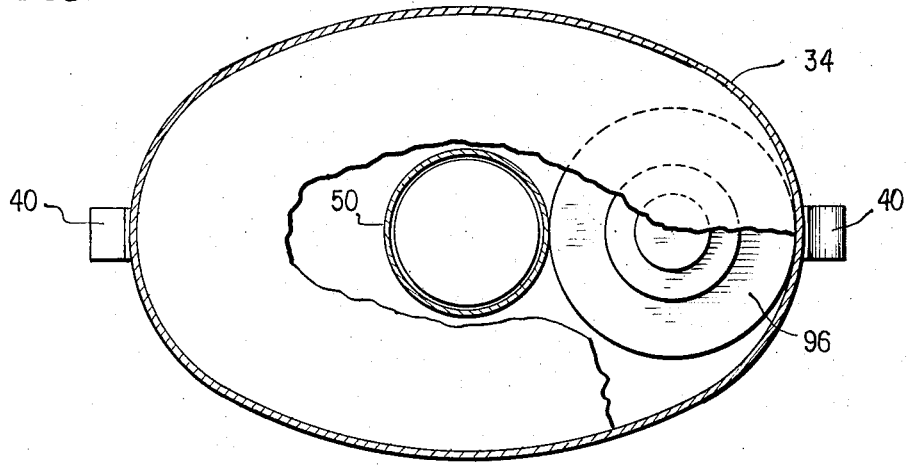
FIG. 5 is a transverse sectional view taken generally along the line 5—5 of FIG. 3.

A narrow shaft 130 projects forwardly beyond the forward face 132 of the rocket motor with such shaft being parallel to the central axis 116 of the rocket motor. A vane means generally designated 134 is mounted on the shaft 130. As best shown in FIG. 4, the vane means 134 consists of a pair of flat vane members 136, 138 which are pivotally or hingeably mounted about the shaft 130 and are capable of folding toward one another. Ordinarly the vanes 136 and 138 would subtend between them an angle between 90° and 120°. The vanes are held in this generally V-shaped configuration having a dihedral angle between them by means of a preloaded torsional spring 140 a portion of which is shown in FIG. 4. If any airstream component is acting normal or perpendicular to the central axis 116 of the rocket and of the shaft 130, the vanes 136 and 138 will tend to align themselves perpendicularly to such component. However, if the aerodynamic forces exerted by these normal airstream components exceed a certain predetermined design value the vane surfaces 136 and 138 will fold toward one another, decreasing the angle therebetween and assuming a more pronounced sweepback disposition. An extremely high velocities, the surfaces 136 and 138 will approach parallelism with each other and the angle therebetween will approach zero. Thus, by selecting proper characteristics for the torsional spring 140 the magnitude of the aerodynamic components acting normal to the vane means 134 will be automatically limited and such limit value can be held substantially constant.

Figure 7:
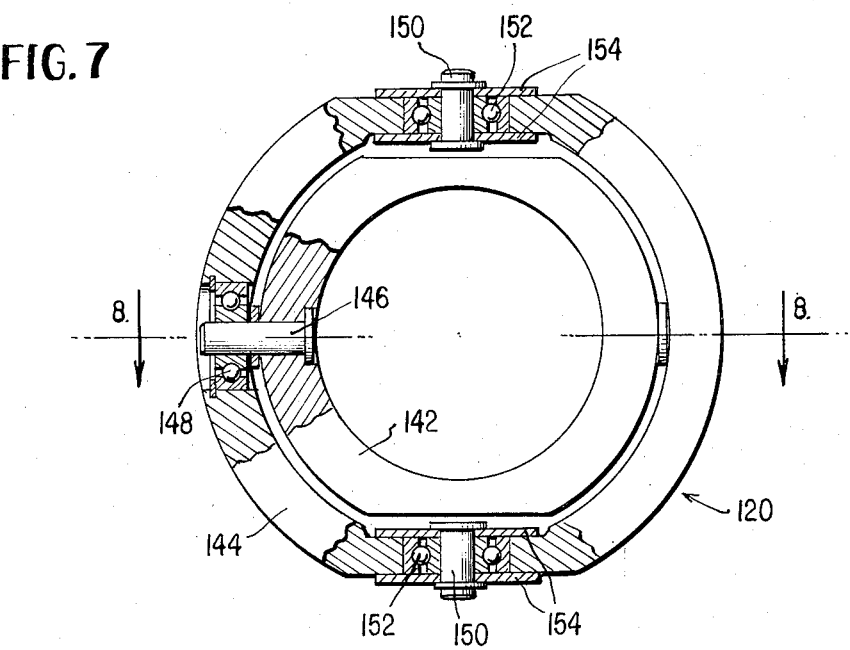
FIG. 7 is a plan view, partially in section, of the gimbal group assembly.
Figure 8:
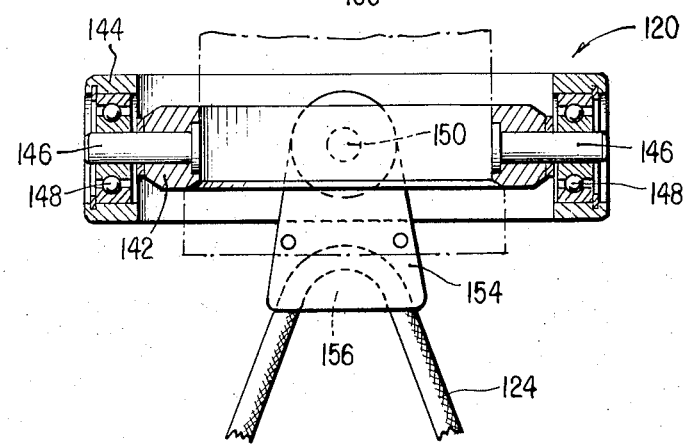
FIG. 8 is a sectional view taken generally along the line 8—8 of FIG. 7.

Referring to FIGS. 7 and 8 for the details of the gimbal 120, it will be seen that such gimbal includes an inner ring 142 and an outer ring 144. A pair of opposed pin members 146 project from the inner ring 142 into bearings 148 in the outer ring 144, thus allowing the inner ring to rotate relatively to the outer ring along an axis. A bridle line support member is pivotally attached to each side of the outer ring 144 by means of pins 150 journaled in bearings 152 in the outer ring 144. The axis of alignment for the opposed pins 150 is displaced 90° from the axis of alignment for the opposed pins 146, as clearly illustrated in FIG. 7. The bridle line support means includes a pair of spaced plate members 154 having a rounded bearing surface 156 extending between them at their lower ends so that the bridle lines 124 can be trained over the support surface 156 as shown in FIG. 8.

Figure 9:
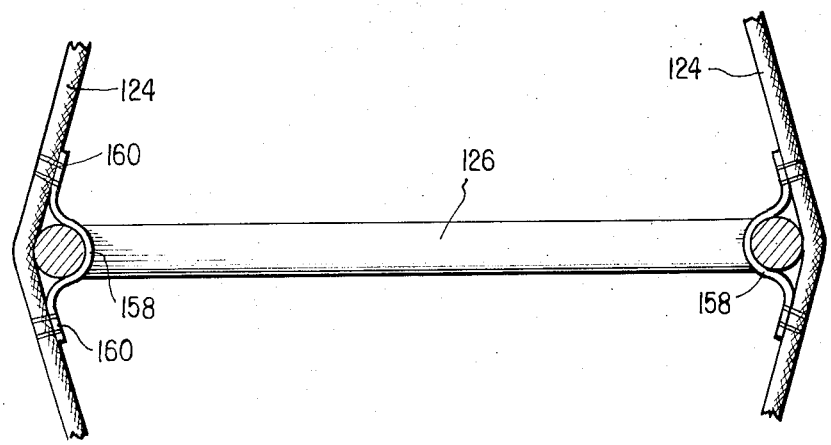
FIG. 9 is a fragmentary diagrammatic view of the caging ring and its manner of attachment.

Finally, as shown in FIG. 9, the bridle lines 124 extend about the exterior of the caging ring 126 and are connected thereto by means of loops 158 which are stitched at 160 to the bridle lines both above and below the caging ring 126.

Consider now the assembly of the apparatus as shown in FIG. 3. As can be seen, the container cover 122 overlies the open top 36 of the container cylinder 34 thereby closing the same. The nose portion 112 of the rocket and the vane assembly extend above the cover 122. A pair of lugs 162 are connected on opposite sides of the rocket manifold or nose portion 112, as shown in FIGS. 3 and 4, and screws or bolts 164 are threaded through such lugs. By tightening such bolts 164, the cover 122 is pressed against the container cylinder 34 which in turn is pressed against its base plate 38. Although not illustrated, it will be understood that the riser links 86 pass through the seal between the container cylinder 34 and its cover 122 so that the risers can connect to the harness attached to the man M. When the bolts 164 are properly tightened, the entire container subassembly 26 will be maintained hermetically sealed and air tight thus preventing damage or contamination to the parts disposed within the cylinder.

The shear bolt 54 projecting through the top of the launch tube 50 screws at least partially into the body of the rocket motor 110 to thus maintain the rocket motor in position within the launch tube. When compressed gas is fed to the launch tube through the control hose 48, as occurs when an escape sequence is initiated, the driving piston 56 is forced upwardly against the rear or bottom end of the rocket motor 110 and when sufficient force is built up, the bolt 54 is sheared. Further upward force by the driving piston 33 launches the rocket motor 110 and, in a manner to be described hereinafter, frees the top or lid 122 from the container 34. Similarly, the container body 34 is freed from engagement with the base plate 60 although its complete separation is prevented by the limit straps 40. However, since the container cylinder at this point is free to move laterally relative to the launch tube 50, the spreading assembly 96 can readily move upwardly pass the upper edge of the now empty launch tube and through the opening 36 at the top of the container.

To now refer to the sequence of operations in general, attention is directed to FIGS. 11-15 hereof. In FIG. 11, the man M is shown seated in the cockpit on his seat 24 using the container assembly 26 as a head rest. Assuming that the aircraft 20 is somehow disabled or incapacitated requiring the man M to escape from the cockpit 22, such escape operation is ordinarily initiated by pulling a control handle or lever adjacent the seat 24. As is customary in the art, operation of such a control handle or lever would initiate a gas sequencing and porting arrangement which would open, break or otherwise remove the canopy, as by activation of ballistic means, and which could, if necessary, sever or remove the rotor blades of the aircraft, which again could be accomplished by a explosive means. Then, the gas would port through the control hose 48 to drive the piston 56 upwardly with a force sufficient to shear the bolt 54. Once the bolt 54 is sheared the rocket motor 110 is separated from its connection with the launch tube 50 and it will be propelled upwardly by sliding through the inner ring 142 of the gimbal 120. Once the rocket motor has moved a sufficient distance upwardly, a shoulder 170 thereon, into which the shear bolt 54 was screwed, will contact the underside of the gimbal 120 and will thus lift the gimbal upwardly thereby stretching the bridle lines 124. Likewise, the upper surface of the gimbal will contact the underside of the container cover 122 and will lift the same away from the container 34, thus opening the top 36 of the container to permit the parachute subassembly 28 to lift out of the container by the drag force exerted on the towline 106. The driving piston 56 will move upwardly until the upper end thereof contacts the internal shoulder 52 on the launch tube 50 which limits further upward motion. However, the momentum of the launched rocket assembly will continue to cause the rocket to move away from the launch tube, thus pulling the cutting lanyard 94 toward a taut condition. An auxiliary line 172, as shown in FIG. 1, is connected with the cutting lanyard 94 to pull a sear pin 174 which holds the rocket firing mechanism, located in the base of the rocket motor. Once the sear 174 is pulled, the rocket motor is ignited, as shown in FIG. 12. After rocket ignition, the rocket motor thrusts upwardly, thus lifting the sleeve 68 with the parachute assembly therein out of the container until the rocket force is eventually transferred to the man M to lift him out of the aircraft. The force transfer from the rocket to the man takes place by transferring force from the rocket motor 110 to the gimbal 120, from the gimbal 120 via the caging ring 126 and bridle lines 124 to the towline 106 and hence too the apex of the sleeve 68, from the apex of the sleeve along the walls of the sleeve to the lower tie lines 88 and the cutters 92 thereon, from the lower tie lines 88 through the links 86 through the riser lines 84 which are connected to the parachute harness which encircles the man M.

Referring to FIG. 13, the previously described configuration is illustrated just before the next deployment stage is started. As the cutting lanyard 94 pulls taut, it operates the cutters 92 to sever the lower tie lines 88 at the bottom of the sleeve. Thus, the load path from the riser lines 84 goes through the links 86 directly to the canopy suspension lines. At this point, the extraction acceleration on the man M is terminated and he continues his movement by coasting along the remaining trajectory.

Figure 14:
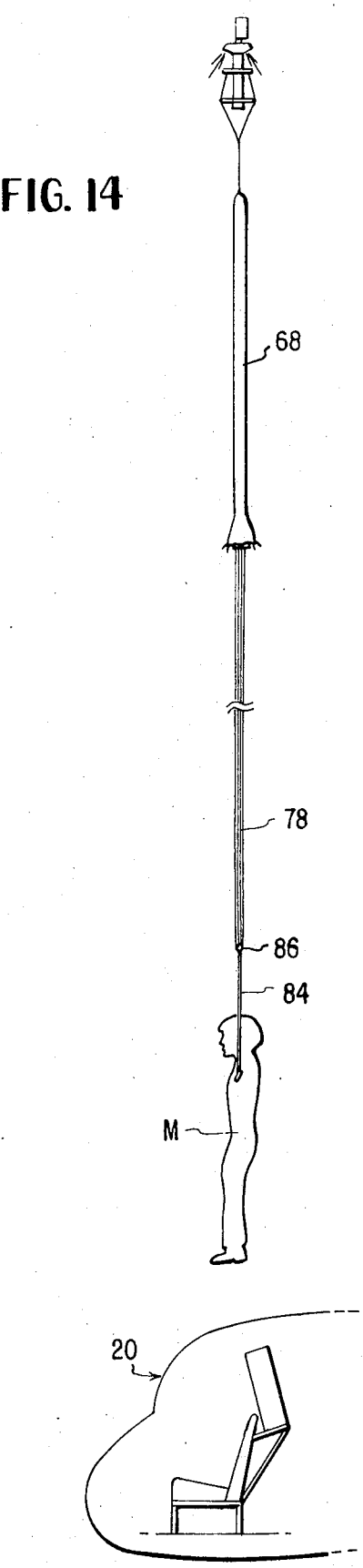

In FIG. 14, which illustrates the commencement of parachute deployment, the riser lines 84 operating through the links 86 pull the suspension lines 78 through the bottom of the sleeve 68. The canopy 66 is connected to the sleeve by means of the upper tie line 72 which is equipped with cutters 76. This connection is not disturbed as long as the rocket motor continues to burn and produce thrust. The burning time of the rocket is designed so that burn out will take place before all of the suspension lines 78 have been deployed out of the sleeve. The last portion of the suspension lines pay out of the sleeve by momentum of the now coasting extraction subassembly 30 and canopy 66 and sleeve 68. As the last portion of the suspension lines feeds out of the sleeve, line cutters 76 cut the upper tie line 72 thus severing the connection between the sleeve apex and the canopy.

Figure 15:
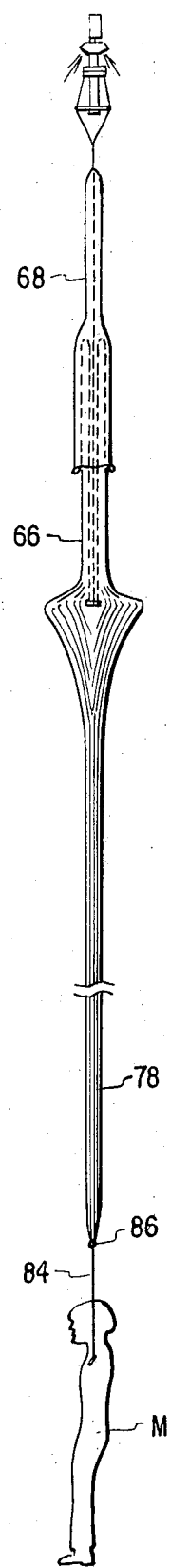

Referring now to FIG. 15, the canopy 66 is shown being deployed out of the lower end of the sleeve 68. Before the canopy is totally pulled from the sleeve, the spreading gun firing lanyard connected to the sleeve apex and the spreading gun sear 102 pulls taut, thus opeerating the spreading gun 96 to fire the projectiles 98 outwardly. While the slugs by their momentum continue to spread the canopy radially the remainder of the sleeve is pulled free from the canopy. It separates completely from the canopy and keeps trailing the coasting mass of the extraction subassembly 30 which is moving away from the man M and his parachute. By then, the canopy is fully inflated and the man is lowered to the ground in a safe recovery.

It should thus be understood that the system thus far described has the ability to achieve the desirable objectives of extracting the man from the cockpit, positively deploying the parachute by continuing action of the rocket motor, positively spreading the canopy by means of the power action of the spreading gun and pre-positioning of the parachute above the man in its optimum position for rapid filling and support without requiring a pendulum swinging of the man relative to the canopy. In the event that the escape take place from an initially hovering and then vertically free falling helicopter, where there is no helicopter inversion and where the extraction can take place straight upwardly above the falling helicopter, as illustrated in FIGS. 12–14, the apparatus has thus accomplished escape and recovery by positive action which require a minimum amount of time and a minimum vertical distance to reach the condition where steady-state parachute decent is established.

Attention will now be directed to the feature for which the present invention is particularly adapted and particularly useful, namely, escaping from an initially hovering aircraft, which, through incapacitation or disability, has been turned into an inverted attitude. Even from such an inverted attitude, the present invention makes it possible to escape and accomplish parachute inflation and recovery under the same optimum conditions as described hereinabove in connection with an upright escape. Referring to FIG. 6, it can again be seen that the caging ring 126 limits freedom of rotation of the rocket motor 110 about its support in the gimbal means 120. Specifically, the rocket motor is supported on the inner gimbal ring 142 which in turn is pivotally mounted on the outer gimbal ring 144. When aerodynamic forces acting on the vane means 134 cause the rocket motor to move, such motion is transmitted to the gimbal means 120 causing the inner ring 142 to rotate relatively to the outer ring 144. When such rotation or movement has occurred enough for the rear end of the rocket motor 110 to contact against the interior of the caging ring 126, that is, when the rocket motor has been displaced by an angle equal to $\beta_{max}$ then further rotation of the rocket motor is prevented. At this point in time, further rotation of the rocket can occur only about the bridle line confluence point 128 which is displaced a distance $l_2$ from the center of gravity 118 of the rocket mass. The bridle lines 124 which are connected between the gimbal means 120 and the towline 106, and which also serve to mount and support the caging ring 126, can be made of flexible steel cable or of any suitable synthetic fiber composition. Since the towline 106 will be pulled taut, the bridle lines 124 will be rigidized in the geometry shown in FIG. 6 and will exert the desired motion limiting effect on rotation of the rocket motor by means of the caging ring 126.

Figure 16:
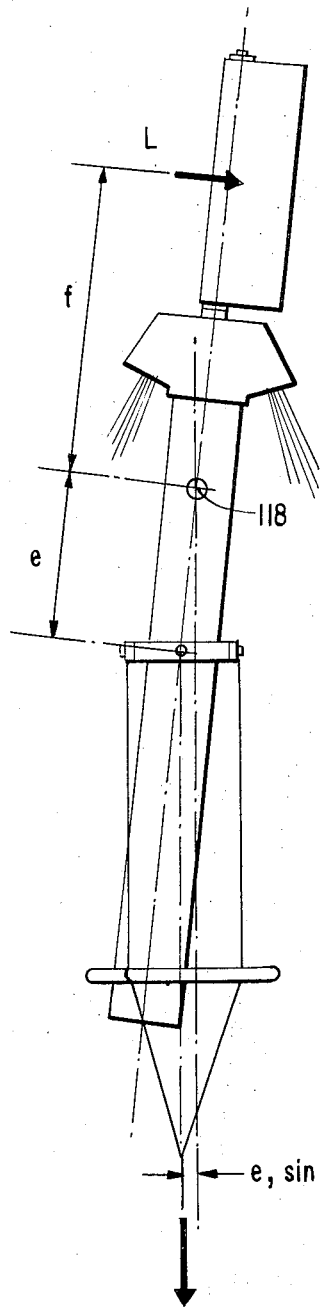
FIGS. 16, 17 and 18 are diagrammatic view of the extraction apparatus subassembly and the physics of the forces thereon during operation.
Figure 17:
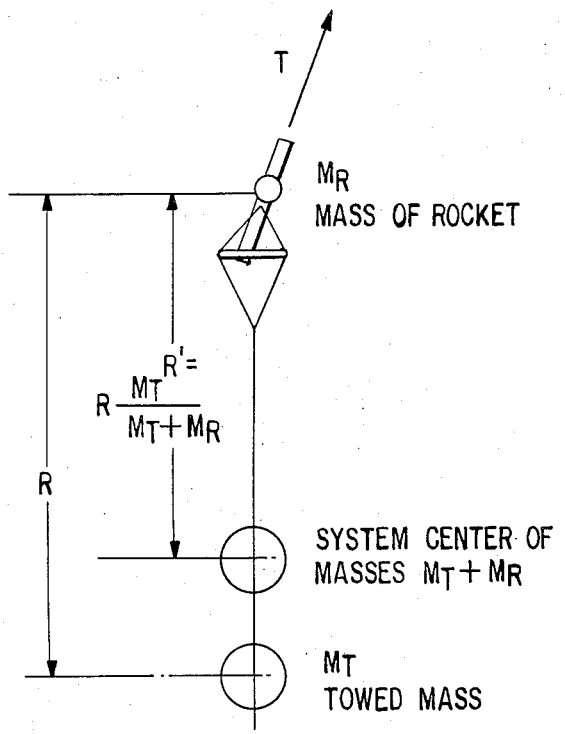
Figure 18:
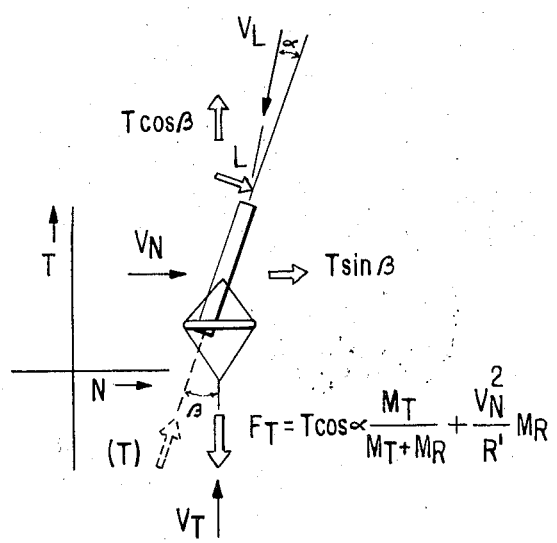

If reference is now made to FIGS. 16, 17 and 18, the physics of the apparatus can be explained. In such figures, it will be understood that a rocket thrust T will produce a reaction force F stemming from the inertia of the towed mass $m_t$. Aerodynamic forces acting normal to the vane means 134 at the forward end of the rocket will produce a lift force which is designated L. The distance between the lift force and the center of gravity of the rocket motor mass 118 is designated $f$ and the distance from the center of gravity 118 to the gimbal rotational axis, as defined by the pins 146, is designated $e$.

The rocket is shown in FIG. 16 under an angular displacement denoted as $\beta$. Using the center of gravity 118 as reference point, equilibrium of moments will occur when $L \times f = F \times e \sin \beta$, or for small angles, $Lf = F e \beta$. In the special case where the rocket is headed straight into the relative wind, $\beta$ becomes the angle of attack $\alpha$, and $Lf = F e \alpha$. From basic aerodynamics it is known that the lift is a function of the vane area A, of the lift coefficient $C_L$ and of the dynamic pressure $q$: $L = dC/d\alpha \; \alpha A \; q$. Thus, in this special case $dC/d\alpha \; \alpha \; A \; q = F e \alpha$, or $dC_L/d\alpha \; A \; q = F e$. In this equation, the left hand side is the term for the destabilizing moment, which tries to misalign the rocket through an increasing angle $\alpha$. The right hand side is the restoring, stabilizing term which denotes the straightening effect of the mass forces. If the left hand term is greater than the right hand term, the rocket will break out to the side and pull the tow mass in a curved path. In the opposite case the rocket will pursue a straight path. A set of engineering parameters can be selected that will make the extraction apparatus stable below a selected value of $q$ and therefore of the velocity with which the rocket is heading into the air, but which will cause instability above this threshold value. When applied to the case of the hovering helicopter losing its power and stability in an emergency, the escape device powered by the described extraction apparatus will automatically discriminate between an inverted or level attitude of the helicopter. During escape from a helicopter which is in a correct or upright attitude, the vane will sense a small or even negative velocity which is the difference between extraction velocity and sink rate and the escape trajectory will be a straight line up with the parachute ahead of and above the man, as previously described. However, if the helicopter is in an inverted attitude when escape occurs, the velocities will be additive thus causing the escape trajectory to curve. By proper selection of the engineering parameters $e$, $f$, $A$, $\tau$, rocket burning time, tow line length, and so on, the trajectory can be curved sufficiently to pull the man evasively around the helicopter and to place his parachute above him, thereby providing the optimum conditions for recovery.

In a general case where $\beta$ is not identical $\alpha$, the extraction apparatus is still governed by the equation $Lf = F e \sin \beta$. The rocket will simply align itself by the angle $\beta$ which satisfies the equilibrium of moments. The rocket being misaligned by the angle $\beta$ from the direction of the tow line will be accelerated laterally under the influence of the thrust component $\tau \sin \beta$, attaining an increasing sweep velocity, $V_n$, normal to the tow line. However, as $V_n$ builds up, the lift on the control vane decreases. The restoring mass moment reduces the tilt $\beta$ until the extraction apparatus reaches an equilibrium value of $V_n$, termed "sweep velocity." Both L and F are functions of this sweep velocity $V_n$ and the magnitude of L arises because of aerodynamics, and the magnitude of F arises because of the centrifugal term $V_n 2/R'$ which is caused by the extraction apparatus rotating, at a distance $R'$, around the common mass center of both its own mass and the towed mass, as illustrated in FIGS. 17 and 18.

Figure 19:
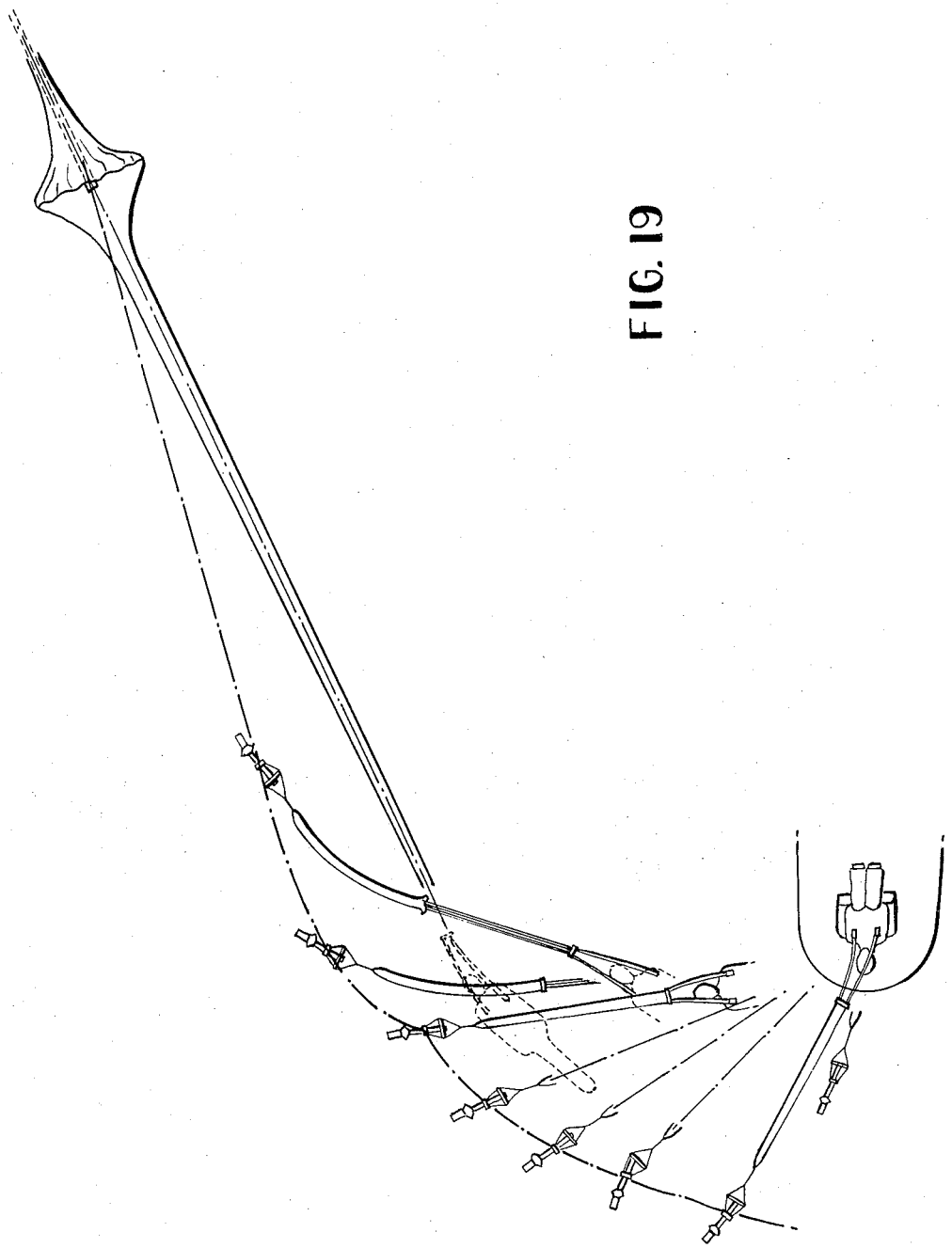
FIG. 19 is a sequential view showing the trajectory path from an inverted escape at zero velocity.

FIG. 19 shows the trajectories of both the rocket and the towed mass during an escape from a helicopter which is in an inverted attitude. In this example, the towed mass consists of a man who is being extracted from an inverted, initially hovering helicopter experiencing a sink rate of 64 feet per second at the time of escape activiation. The intial extraction direction was, in this example, selected to be 15° ($\alpha + \beta$).

Specific values for such selective engineering variables as $e$, $f$, $\beta_{max}$, thrust, thrust duration, vane area, rocket moment of inertia were applied in this example, as follows: $e = 0.24''$, $f = 18''$, $\beta_{max} = 12°$, $\tau = 963$ lbs., $t_B = 0.4$ sec., $A = 0.4$ sq. ft., $I_R = 0.03$ ft. lbs./sec.$^2$ .

The vector diagrams denoting the air flow conditions for the vane at different special positions reveal values for the equilibrium sweep velocity $V_n$ that at any point governs the system while it is further subject to changing spatial orientation relative to gravity vector and to the increasing velocity of the towed load and to vertical free fall.

The invention recognizes and utilizes the influence of the value $e$ denoting the distance between the gimbal point and the rocket CG. The larger the value of $e$, the greater is the stabilizing term. However, since the vane parameters also control the magnitude of the sweep velocity $V_n$, the extraction apparatus would also function if $e$ is selected to become negative, indicating that the rocket CG is below the gimbal point. The extraction apparatus would then be unstable at any speed, but the sweep velocity $V_n$ can be controlled within usable limits by the vane area and its distance from the CG. However, the change in $\beta$ would be abrupt whenever $\alpha$ passes through a value of zero, causing overshoots and oscillations in the value of $V_n$.

Figure 20:
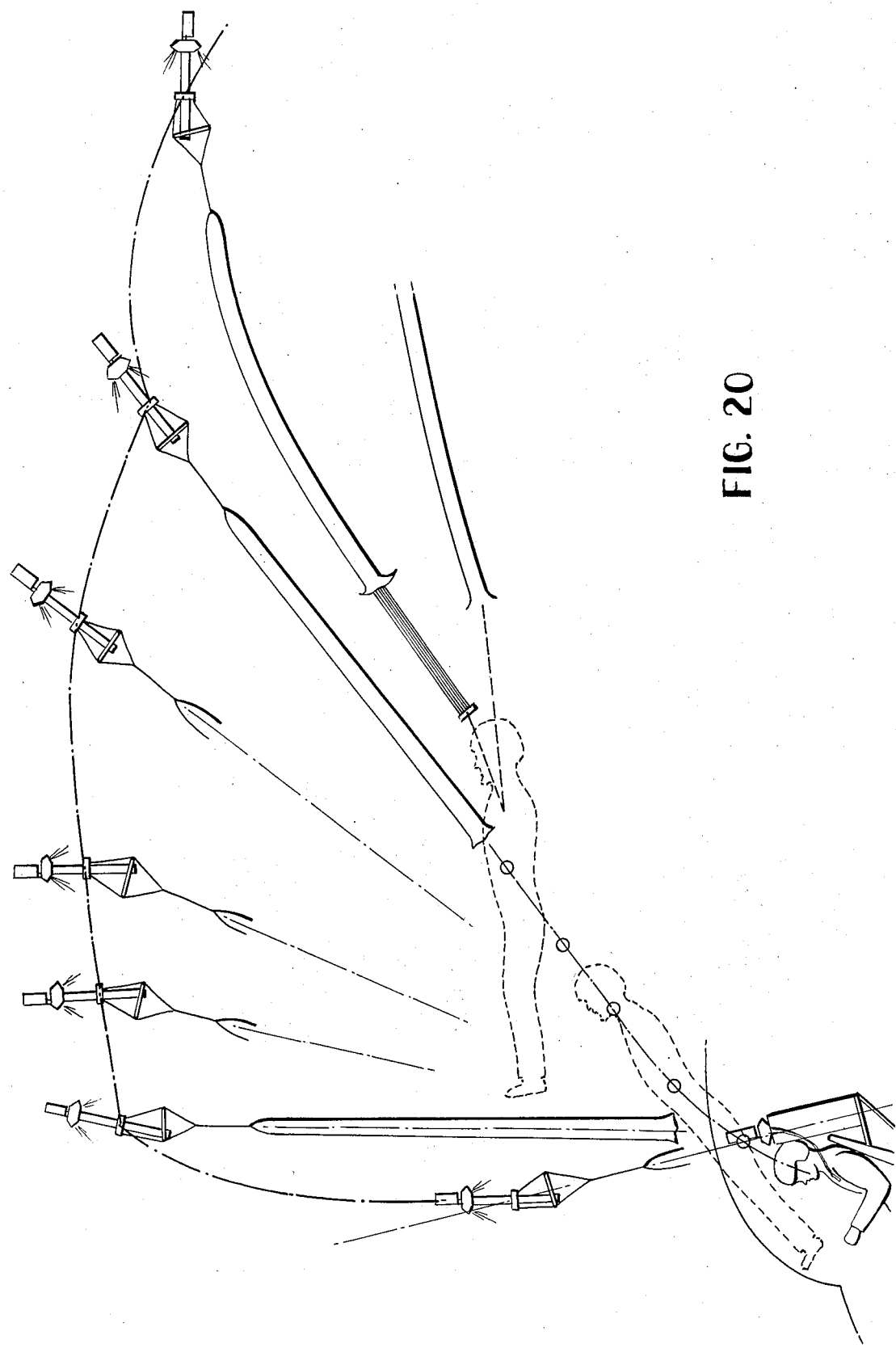
FIG. 20 is a sequential view of the trajectory path of escape from an upright helicopter travelling at a forward velocity.

Finally, FIG. 20 illustrates the escape trajectory as the same would occur when the aircraft or helicopter was operating under normal flight conditions, that is, in a non-hovering situation with a forward velocity of approximately 200 knots. By virtue of the fact that the vane means 134 is foldable under aerodynamic force conditions since the vanes 136 and 138 can fold toward one another against the action of the torsion spring 140, the aerodynamic forces acting on the rocket are necessarily limited, as in contrast to the case which would occur if the vane members were fixed and the dihedral angle between the members could not be reduced. Because of the force limiting effect which occurs through folding of the vane members, the aerodynamic forces do not turn the rocket excessively and the trajectory of the escape path is not excessively curved backwards but instead assumes the orientation and configuration shown in FIG. 20.

Alternative arrangements can be provided if the apparatus is to be used at very high flight velocities. One way would be to simply raise the center of gravity 118 of the rocket motor mass which would have the effect of lowering the aerodynamic center of pressure point by increasing the wind exposed area of the rocket motor projecting below the gimbal mounting point. This lowering of the center of pressure, which would occur when the vanes folded toward one another at high flight velocities, could assure that the extraction apparatus would automatically head into the wind when escape occurred above a selected upper velocity limit. Another alternative arrangement would be to add a light weight sleeve to the inner gimbal ring 142 with the sleeve having a length somewhat in excess of the rear portion of the rocket motor, that is, the portion projecting beneath the gimbal toward the caging ring. Because of the length of this light weight sleeve, it would present an additional aerodynamic surface exposed to a cross stream velocity component. The aerodynamic drag on the sleeve would be proportional to the square of the cross stream velocity component while the drag on the folding vane means 134 would remain substantially constant. Thus, at high flight velocities the extraction apparatus could be prevented from curving down stream, but at escape conditions at zero velocity where the aircraft was hovering the vane means could still perform its desired function.

A still further means for modulating the aerodynamically induced divergence could be provided by a timed locking arrangement of the gimbal means 120. With such an arrangement, in the initial part of its trajectory, the rocket would be prevented from rotating about the gimbal and hence tilting within its cage formed by the caging ring and bridle lines. After a predetermined time, the locking restraint on the gimbal means could be removed and the extraction apparatus could then introduce the trajectory divergence. In this manner, the man could be extracted sideways in a straight path until he is out of the vicinity of the rotor blades, whereupon the gimbal locking restraint could be released and the trajectory path could then curve down stream for best recovery positioning. Alternatively, instead of actually locking the gimbal itself, such staging could be accomplished simply by tying the rocket motor 110 to the caging ring 126 by means of a line which would be cut after a predetermined time interval by means of a line cutter incorporating a delay fuse. Another possibility for accomplishing such modulation would be to use the decrease in the stabilizing mass force which would occur when the lower cutters 92 cut the load path between the rocket and the man.

After reading the foregoing detailed description, it should be apparent that the objects set forth at the outset to the specification have been successfully achieved by the present invention. However, various changes apparent to those skilled in the art can be made without departing from the spirit and scope of the invention as defined in the appended claims.

What is claimed is:

1. In an escape and recovery system particularly adapted for recovery of an occupant from a disabled aircraft of a type capable of hovering at low altitudes, which system includes a parachute assembly attached to the occupant and a rocket means for extracting the parachute assembly and the occupant from the aircraft, the improvement which comprises:

lift producing means mounted at the forward end of said rocket, said lift producing means including at least one vane member against which the airstream force can impinge as the rocket travels through the airstream;

gimbal mounting means for said rocket to permit said rocket to rotate relative thereto; and coupling means connected between said gimbal mounting means and said parachute assembly;

said coupling means including motion limiting means which limits the amount of rotation of said rocket relative to said gimbal mounting means.

2. The improvement defined in claim 1 wherein said rocket has a central axis of elongation and wherein said gimbal mounting means has an axis of rotation perpendicular to said rocket central axis.

3. The improvement defined in claim 1 wherein said motion limiting means is a ring member having an internal diameter exceeding the transverse diameter of said rocket, said ring member being positioned between said gimbal mounting means and the rear end of said rocket so that after said rocket rotates within said gimbal mounting means for a predetermined distance, it will contact against said ring member which will halt further rotation.

4. The improvement defined in claim 1 wherein said lift producing means includes a pair of vane members which are disposed angularly to one another to subtend a dihedral angle between the vane member surfaces, with said vane members converging at an apex aligned with or parallel to the central axis of elongation of said rocket.

5. The improvement defined in claim 4 wherein said vane members are foldable toward each other under higher velocity airstream forces and wherein spring means are provided to normally bias said vane members away from each other.

6. The improvement defined in claim 1 wherein said coupling means includes a plurality of lines pivotally connected to said gimbal mounting means and extending rearwardly therefrom to a confluence point disposed rearwardly of the rocket, and further includes a towline connected between said confluence point and said parachute assembly.

7. The improvement defined in claim 6 wherein said motion limiting means is a ring supported by said pair of lines at a location between said gimbal mounting means and said confluence point, with said location being selected so that when said rocket rotates about said gimbal mounting means, the rear portion of said rocket will contact said ring after a preselected amount of rocket rotation has occurred.

8. The improvement defined in claim 6 wherein said gimbal mounting means includes an inner gimbal ring abutting against a medial portion of said rocket and an outer gimbal ring pivotally attached to said inner gimbal ring by a pair of pivot pins aligned along a pivot axis perpendicular to the axis of elongation of said rocket.

9. The improvement defined in claim 8 wherein said pair of lines are pivotally attached to said outer gimbal ring by mounts which are attached by a pair of pivot pins aligned along a pivot axis which is perpendicular to both the pivot axis of the inner and outer gimbal rings and the axis of elongation of said rocket.

10. Apparatus for permitting the escape and recovery of an occupant a disabled aircraft of the type which is capable of hovering at low altitudes, comprising:
a container means mounted within the aircraft;
a parachute assembly initially stowed within said container means;
extraction means initially stowed within said container means and operative to initially extract said parachute assembly from said container means and to subsequently extract said occupant from said aircraft;
said extraction means including a rocket, gimbal mounting means for said rocket, and coupling means connecting said gimbal mounting means with said parachute assembly;
launch means connected with said container means to launch said extraction means from said container means with said rocket in unignited condition; and
means for igniting said rocket after it has been launched to cause said rocket to exert a positive pulling force through said coupling means to said parachute assembly to extract said parachute assembly from said container means;
said parachute assembly being connected to said occupant so that continued pulling force from the ignited flight of said rocket will extract said occupant from said aircraft;
said rocket having aerodynamic means connected therewith and responsive to aerodynamic forces acting thereon to cause said rocket to rotate about said gimbal mounting means and to head into a downwind direction in the airstream;
said rotation of said rocket about said gimbal mounting means causing said coupling means to pull said parachute assembly from its initial trajectory path to follow said rocket into said downwind direction, whereupon said canopy is inflated for recovery of the occupant.

11. Apparatus as defined in claim 10 wherein said container means is hermetically sealed prior to actuation of said launch means.

12. Apparatus as defined in claim 10 wherein said parachute assembly includes a canopy, a power operated canopy spreading device, suspension lines for connection to said occupant and a stowage sleeve within which said canopy, spreading device and suspension lines are initially stowed.

13. Apparatus as defined in claim 10 wherein said launch means includes a launch tube within said container means and conduit means for connecting said launch tube with a pressurized power supply.

14. Apparatus as defined in claim 13 wherein said rocket is initially disposed in said launch tube and is connected therewith by a shear bolt which is sheared when said launch means is activated.

15. Apparatus as defined in claim 10 wherein said aerodynamically unstable means comprises vane means mounted at the forward end of said rocket.

16. Apparatus as defined in claim 15 wherein said vane means includes a pair of vane members which are disposed angularly to one another to subtend a dihedral angle between the vane member surfaces, with said vane members converging at an apex aligned with or parallel to the central axis of elongation of said rocket.

17. Apparatus as defined in claim 16 wherein said vane members are foldable toward each other under higher velocity airstream forces and wherein spring means are provided to normally bias said vane members away from each other.

18. Apparatus as defined in claim 10 wherein said coupling means includes a plurality of lines pivotally connected to said gimbal mounting means and extending rearwardly therefrom to a confluence point disposed rearwardly of the rocket, and further includes a towline connected between said confluence point and said parachute assembly.

19. Apparatus as defined in claim 18 wherein said coupling means includes motion limiting means comprising a ring supported by said pair of lines at a location between said gimbal mounting means and said confluence point, with said location beting selected so that when said rocket rotates about said gimbal mounting means, the rear portion of said rocket will contact said ring after a preselected amount of rocket rotation has occurred.

20. Apparatus as defined in claim 18 wherein said gimbal mounting means includes an inner gimbal ring abutting against a medial portion of said rocket and an outer gimbal ring pivotally attached to said inner gimbal ring by a pair of pivot pins aligned along a pivot axis perpendicular to the axis of elongation of said rocket.

21. Apparatus as defined in claim 20 wherein said pair of lines are pivotally attached to said outer gimbal ring by mounts which are attached by a pair of pivot pins aligned along a pivot axis which is perpendicular to both the pivot axis of the inner and outer gimbal rings and the axis of elongation of said rocket.

* * * * *